(12) United States Patent
Fiul

(10) Patent No.: US 8,339,683 B2
(45) Date of Patent: Dec. 25, 2012

(54) LAPTOP COMPUTER WITH SCANNING CAPABILITY

(76) Inventor: Dan Fiul, Springfield, VA (US)

( * ) Notice: Subject to any disclaimer, the term of this patent is extended or adjusted under 35 U.S.C. 154(b) by 508 days.

(21) Appl. No.: 12/461,892

(22) Filed: Aug. 27, 2009

(65) Prior Publication Data

US 2011/0051203 A1 Mar. 3, 2011

(51) Int. Cl.
*H04N 1/04* (2006.01)
(52) U.S. Cl. ......... 358/474; 358/442; 358/443; 358/445
(58) Field of Classification Search ................. 358/474, 358/442, 443, 445, 471, 501, 505
See application file for complete search history.

(56) References Cited

U.S. PATENT DOCUMENTS

| 5,115,374 | A | | 5/1992 | Hongoh | |
| 5,416,610 | A | * | 5/1995 | Kikinis | 358/474 |
| 7,542,178 | B2 | * | 6/2009 | Youden | 358/474 |
| 7,903,143 | B2 | * | 3/2011 | Seddik et al. | 348/207.99 |

* cited by examiner

*Primary Examiner* — Houshang Safaipour
(74) *Attorney, Agent, or Firm* — Dan Fiul

(57) ABSTRACT

A laptop computer is comprised of a base portion, a display portion, and a scanning/illuminating mechanism. The scanning/illuminating mechanism illuminates a display of the display portion of the laptop computer and illuminates a document during scanning of the document.

26 Claims, 5 Drawing Sheets

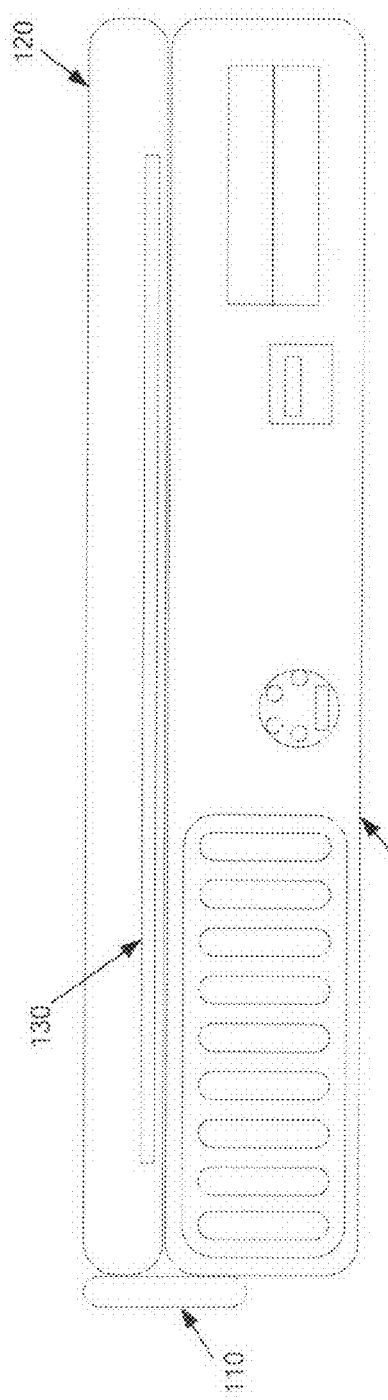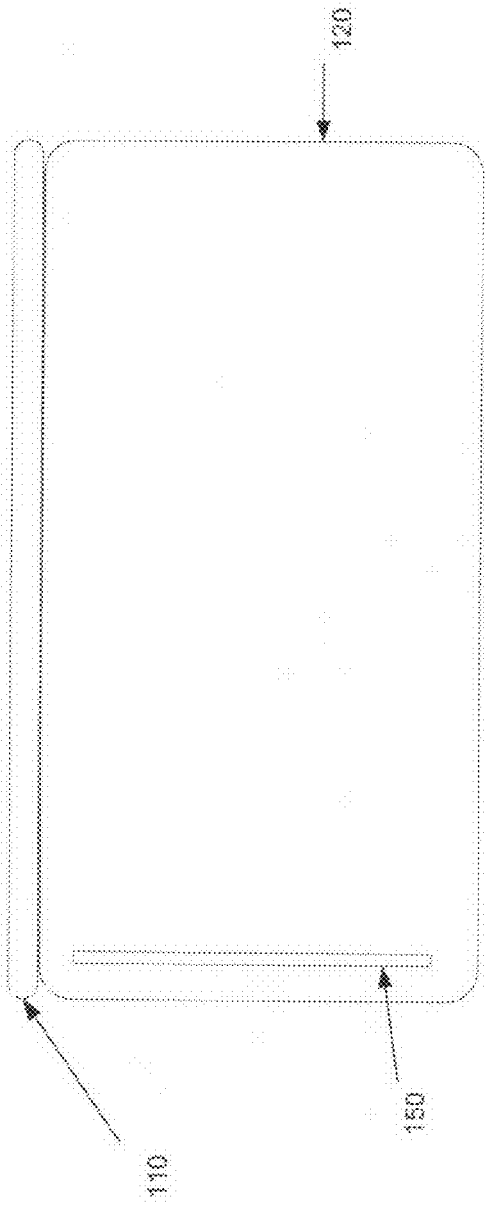

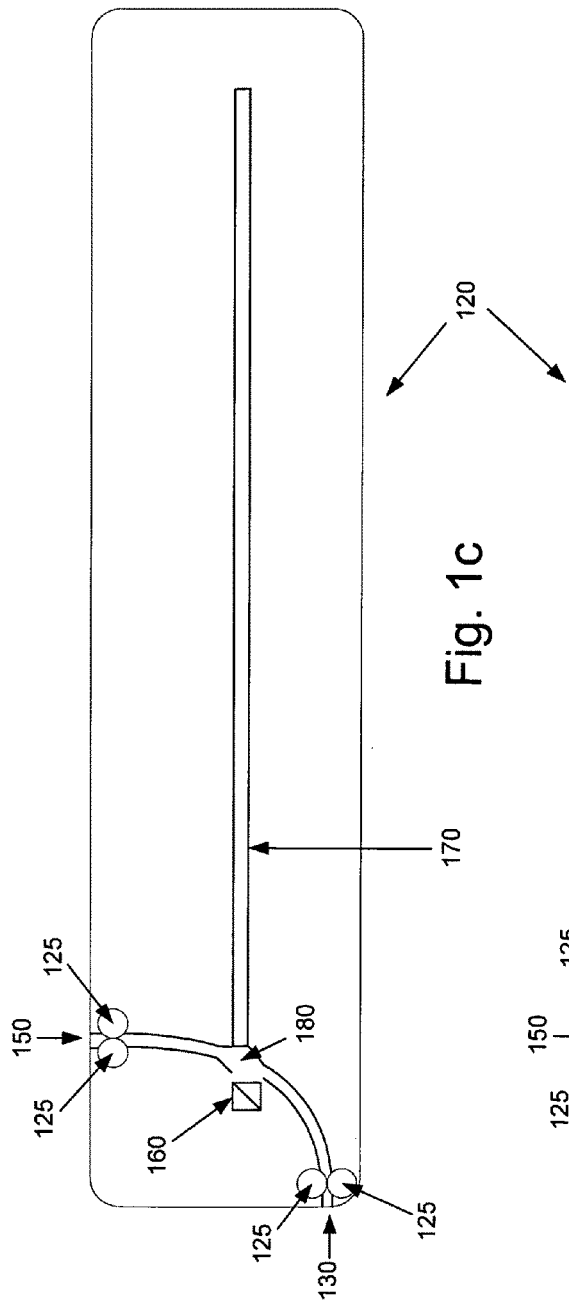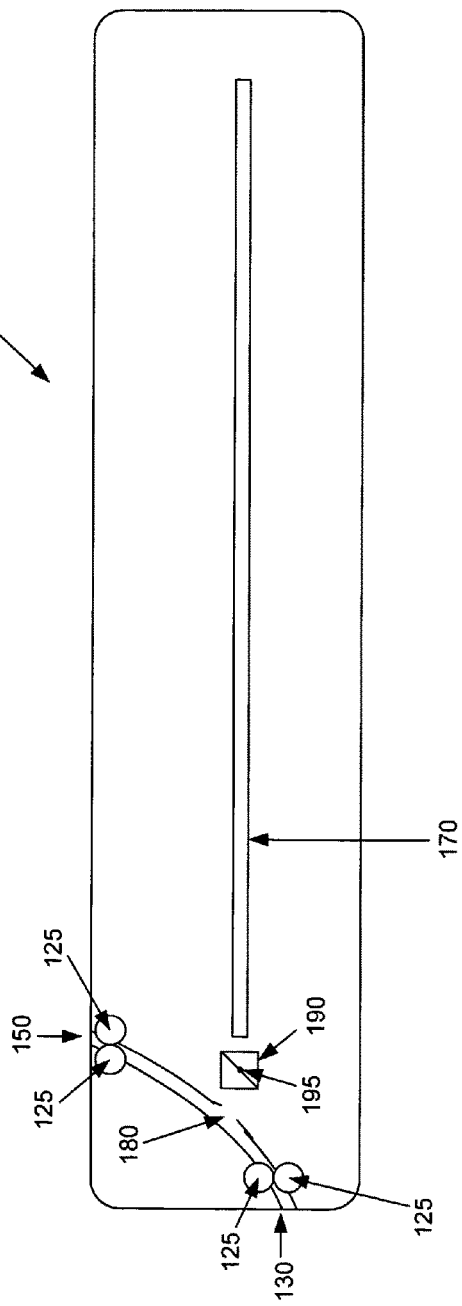

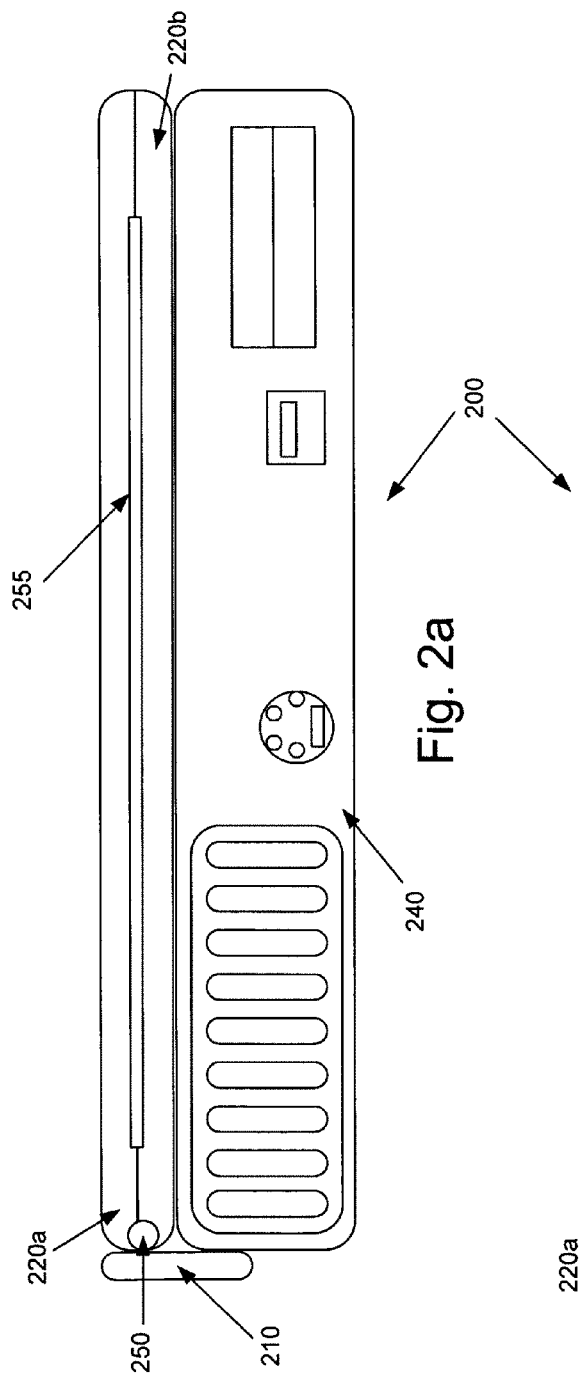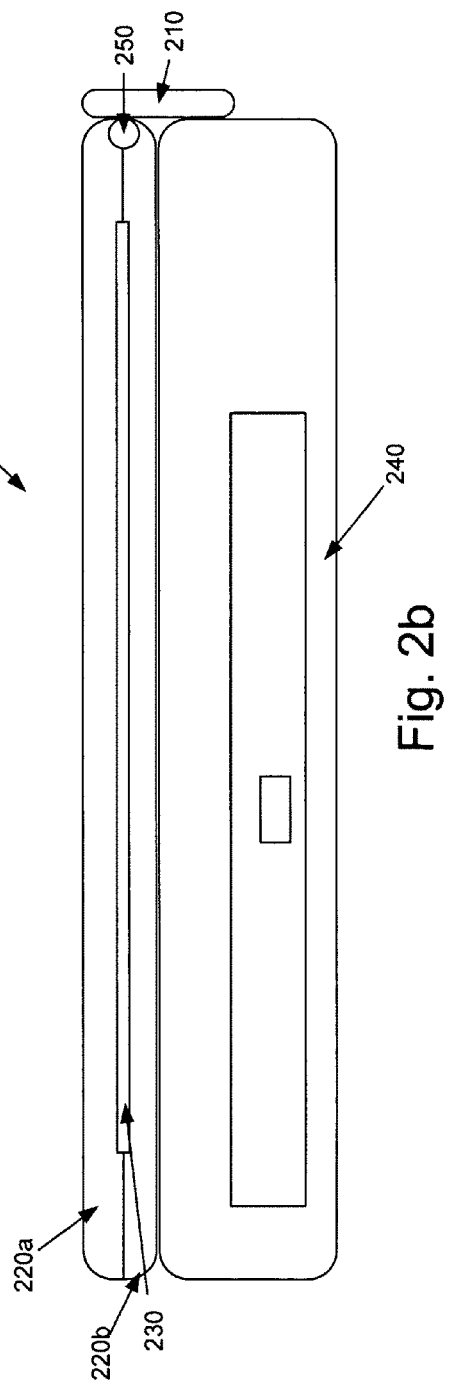

LAPTOP COMPUTER WITH SCANNING CAPABILITY

BACKGROUND OF THE INVENTION

1. Field of the Invention

This invention relates generally to a laptop computer, and more specifically, to a laptop computer that includes a scanning capability.

2. Background of Related Art

The paperless office was touted as being a possibility with the advent of the modern computer. However, instead of reducing the amount of paper that a typical office produces, the modern computer has made it all too convenient to print reams and reams of paper. The paperless office is further out of reach than before the advent of the modern computer within the office environment.

All of these reams of paper result in storage space becoming increasingly strained. Many offices run out of storage space. Offices typically turn to rental storage space to store business records. Storage space, in many instances, is not conveniently located near office buildings. Moreover, searching for a particular piece of paper within a rental storage space that has boxes stacked one atop another is frustrating and inconvenient.

Many offices are turning to digital imaging to archive office records to combat the problems associated with storing large sums of office records. FIG. 3 shows a conventional system for digital imaging. A conventional system 300 for digital imaging 300 includes a laptop computer 320 and a scanner 310.

Using software typically supplied with the scanner 310, a user activates a scanner application on the laptop computer 320. The scanner application on the laptop computer 320 activates the scanner 310 to scan whatever document is placed on the bed of the scanner 310.

The problem with a scanner 310 and laptop computer 320 combination is lack of portability. Although the laptop computer 320 is easily made portable by simply closing the laptop's shell case, the scanner 310 must be transported independently from laptop computer 320. Depending upon the size of the scanner 310, portability of scanning is essentially lost.

A solution to the lack of portability for a scanner and laptop computer is disclosed in U.S. Pat. No. 5,115,374. A scanning mechanism, used for facsimiles, is incorporated into a display module portion of the laptop. With the laptop computer in a closed position, a paper path is accessible from the pivot end of the display module to its opposite end. The image scanner is fixedly located near the pivot point of the display module.

There is a need within the art for MORE portability of a laptop that includes a scanner.

SUMMARY OF THE INVENTION

In accordance with the principles of the invention, a method of scanning a document with a laptop computer provides for a scanning/illuminating mechanism. A display of the laptop computer is illuminated with the scanning/illuminating mechanism. A document is illuminated with the scanning/illuminating mechanism.

In accordance with the principles of the invention, a laptop computer is comprised of a base portion, a display portion, and a scanning/illuminating mechanism. The scanning/illuminating mechanism illuminates a display of the display portion of the laptop computer and illuminates a document during scanning of the document.

BRIEF DESCRIPTION OF THE DRAWINGS

Features and advantages of the present invention will become apparent to those skilled in the art from the following description with reference to the drawings, in which:

FIG. 1a shows a side view of a laptop computer integrating a scanning/illuminating mechanism, in accordance with an embodiment of the principles of the present invention.

FIG. 1b shows a top view of a laptop computer integrating a scanning/illuminating mechanism, in accordance with an embodiment of the principles of the present invention.

FIG. 1c shows a cross-sectional view of the display portion detailing a scanning/illuminating mechanism, in accordance with an embodiment of the principles of the present invention.

FIG. 1d shows an alternative cross-sectional view of the display portion detailing a scanning/illuminating mechanism, in accordance with an embodiment of the principles of the present invention.

FIG. 2a shows a left side view of a laptop computer integrating a scanning mechanism, in accordance with an embodiment of the principles of the present invention.

FIG. 2b shows a right side view of a laptop computer integrating a scanning mechanism, in accordance with an embodiment of the principles of the present invention.

DETAILED DESCRIPTION OF ILLUSTRATIVE EMBODIMENTS

Figure 2C:
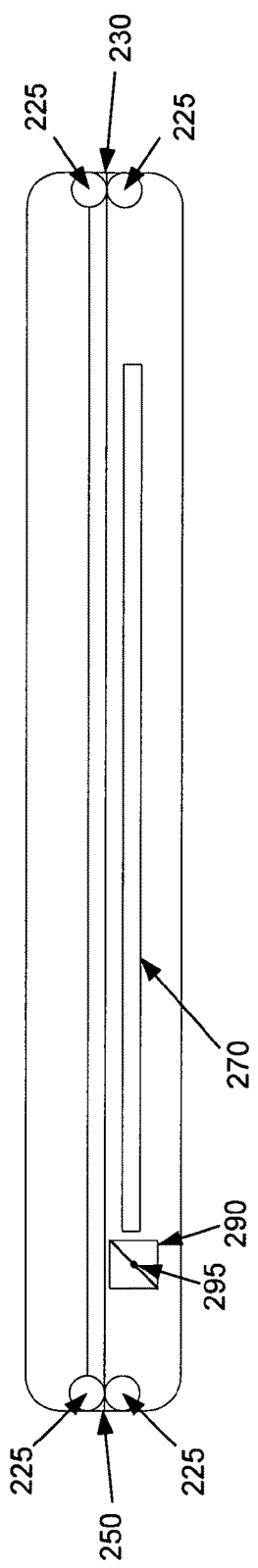
FIG. 2c shows a laptop computer, in accordance with the principles of the present invention.
Figure 3:
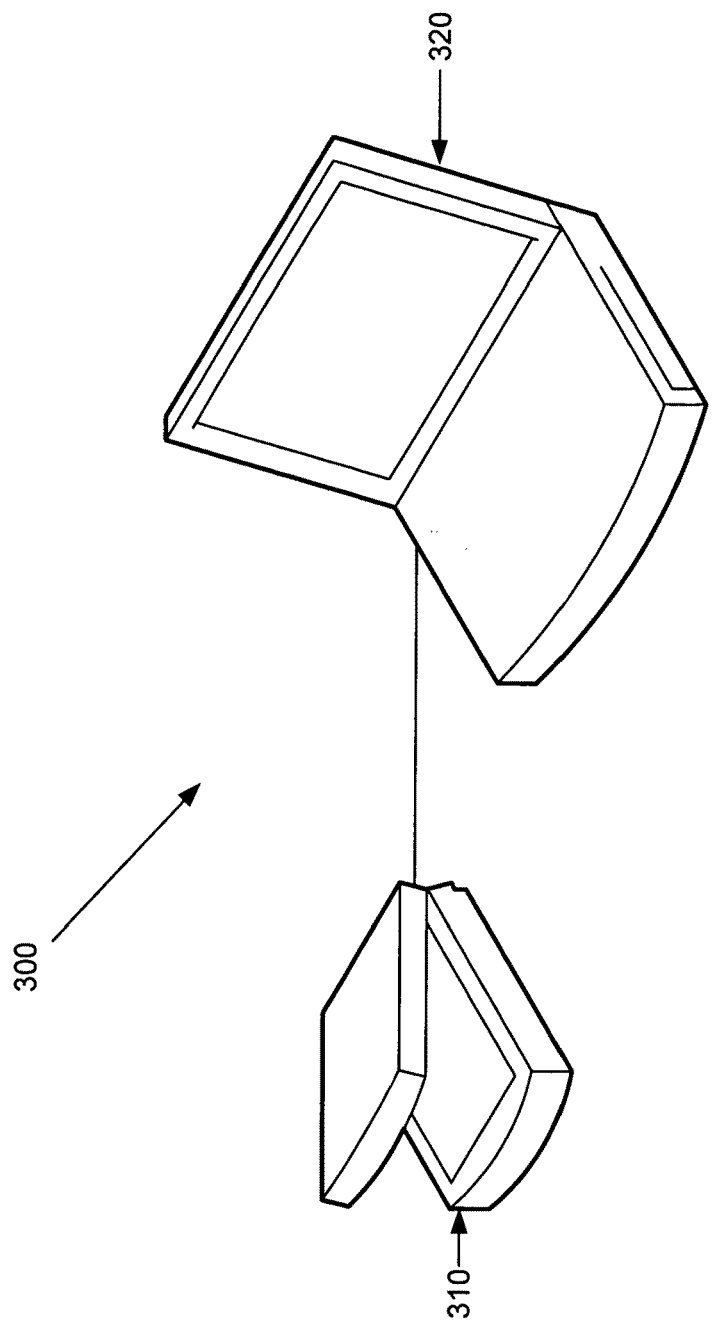
FIG. 3 shows a conventional system for digital imaging.

This invention provides a solution to problems related to portable scanning, and in particular integrating a scanner mechanism with a laptop computer. Instead of using a separate light source for both the laptop computer and a scanner, a single light source is relied on for backlighting of the laptop computer and for scanning purposes. Using a single light source for scanning and backlighting reduces the number of components within the novel laptop computer disclosed herein. Second, the scanner can be used while the laptop is in an open position, making scanning more convenient to the user.

In accordance with the principles of an embodiment of the present invention, a scanning mechanism can be incorporated into the display portion of a laptop computer. A document can pass between the novel scanning/illuminating mechanism disclosed herein and the display of the laptop computer. The novel scanning/light source mechanism can illuminate both the document to be scanned and the display of the laptop computer.

In accordance with the principles of another embodiment of the present invention, the scanning/illuminating mechanism disclosed herein can be pivotally mounted. The scanning/illuminating mechanism can be pivotally mounted to direct its light source perpendicular to the glass of a display. In a perpendicular position, the scanning/illuminating mechanism can scan a document that is taken across its optical sensor. The scanning/illuminating mechanism can be pivotally mounted to direct its light source parallel to the glass of the display of the laptop computer. In a parallel position, the scanning/illuminating mechanism disclosed herein can act as a backlight for the display of the laptop computer A data interface is routed between the laptop computer's motherboard and the scanning/illuminating mechanism to active the scanning mechanism, to change the scanning/illuminating mechanism's brightness, to pivot the scanning/illuminating mechanism, to read an image scanned by the scanning/illuminating mechanism, etc.

FIG. 1a shows a side view of a laptop computer integrating a scanning/illuminating mechanism, in accordance with an embodiment of the principles of the present invention.

In particular, as shown in FIG. 1a, laptop computer 100 can include a hinge 110, a novel display portion 120, and a base portion 140. The novel display portion 120 of the laptop computer 100 can include a scan slot 130.

The hinge 110 allows the display portion 120 to pivotally move about the hinge 110 with respect to the base portion 140, with a clamshell type of movement. As with conventional laptop computers, the hinge 110 provides resistance to movement such that the display portion 120 can be placed at a desired angle with respect to the base portion 140 without movement. A user can arrange the display portion 120 at various degrees of angle with respect to the base portion 140 that are convenient for viewing images on the display portion 120 and/or for scanning documents.

The scan slot 130 can be positioned along a side of the display portion 140 to provide a document entry point or a document exit point from the display portion 120, depending upon the direction of scanning. A user can slide a document into the scan slot 130.

Alternately, a user can retrieve a document that has been scanned from scan slot 130.

FIG. 1b shows a top view of a laptop computer integrating a scanning/illuminating mechanism, in accordance with an embodiment of the principles of the present invention.

In particular, as shown in FIG. 1b, the laptop computer 100 includes a second scan slot 150 that can be positioned along a top of the display portion 120 of the laptop computer 100. Scan slot 150 can provide a document entry point or a document exit point from the display portion 120, depending upon the direction of scanning. A user can slide a document into the scan slot 150. Alternately, a user can retrieve a document that has been scanned from scan slot 150.

FIG. 1c shows a cross-sectional view of the display portion detailing a scanning/illuminating mechanism, in accordance with an embodiment of the principles of the present invention.

In particular, as shown in FIG. 1c, the display portion 120 of the laptop computer 100 can include a scan slot 130, a scan slot 150, various rollers 125, a scanning/illuminating mechanism 160, and a liquid crystal display (LCD) 170.

The various rollers 125 can be either motorized or non-motorized. At least one roller 125 within the display portion 120 is preferably motorized to pull and/or push a document past scanning/illuminating mechanism 160. Preferably, one roller 125 at scan slot 150 and one roller at scan slot 130 is motorized to give a user an option to feed a document either through scan slot 130 or scan slot 150. Image manipulation software (not shown) resident on laptop computer 100 can manipulate the data produced by scanning/illuminating mechanism 160 to automatically orient a document to its proper orientation, depending upon which scan slot 130 or scan slot 150 a user decides to use as an entry point for scanning.

Depending upon the direction of scanning, that is if a user places a document into scan slot 130 or if a user places a document into scan slot 150, the various rollers 125 turn in either a clockwise or counterclockwise direction. Depending upon the direction of scanning, either a roller 125 at scan slot 130 or a roller 125 at scan slot 150 is activated to push and/or pull a document past scanning/illuminating mechanism 160. Alternately, rollers 125 at both scan slot 130 and scan slot 150 can be activated to allow a document to pass over scanning/illuminating mechanism 160.

In accordance with the principles disclosed herein, the scanning/illuminating mechanism 160 can perform two functions. Scanning/illuminating mechanism 160 can include a light source and an image sensor. The light source from scanning/illuminating mechanism 160 can illuminate LCD 170. Moreover, the light source from scanning/illuminating mechanism 160 can illuminate a document that is being scanned by the scanning/illuminating mechanism 160.

The image sensor of scanning/illuminating mechanism 160 provides an image of a document being scanned to the base portion 140 of the laptop computer 100. The interface between scanning/illuminating mechanism 160 can be any of a variety of computer data paths that include both parallel and serial data communication lines, e.g., Small Computer System Interface (SCSI), serial SCSI, Universal Serial Bus (USB), IEEE 1394, Advanced Technology Attachment (ATA), serial ATA (SATA), Peripheral Component Interface (PCI), PCI Express (PCIe), etc.

The scanning/illuminating mechanism 160 can be controlled through software executed on the base portion 140 of the laptop computer 100. The brightness of the light source of the scanning/illuminating mechanism 160 can be controlled through software to adjust the properties of an image produced by the image sensor, e.g., contrast, brightness, etc.

Scanning can be initiated with simply placing a document within either scan slot 130 or scan slot 150. Software within the base portion 140 of the laptop computer 100 can detect that a roller 125 has been slightly turned and automatically initiate scanning of the document placed in scan slot 130 or scan slot 150. Alternately, scanning can be initiated through software executed within the base portion 140 of the laptop computer 100. A user can select to scan a document with an appropriate software application. A user can place a document in scan slot 130 or scan slot 150 either before or after the software application initiates scanning, with scanning of the document being performed appropriately as is known within the art.

Importantly, an illumination gap 180 can provide a path for light to travel from scanning/illuminating mechanism 160 to LCD 170 and also provide a path for a document to pass between the scan slot 130 and scan slot 150, and vise versa.

FIG. 1d shows an alternative cross-sectional view of the display portion detailing a scanning/illuminating mechanism, in accordance with an embodiment of the principles of the present invention.

In particular, as shown in FIG. 1d, the display portion 120 of the laptop computer 100 can include a scan slot 130, a scan slot 150, various rollers 125, a scanning/illuminating mechanism 190, and a liquid crystal display (LCD) 170. The pivotal scanning/illuminating mechanism 190 preferably pivots about pivot point 195.

The various rollers 125 can be either motorized or non-motorized. At least one roller 125 within the display portion 120 is preferably motorized to pull and/or push a document past scanning/illuminating mechanism 160. Preferably, one roller 125 at scan slot 150 and one roller at scan slot 130 is motorized to give a user an option to feed a document either through scan slot 130 or scan slot 150. Image manipulation software (not shown) resident on laptop computer 100 can manipulate the data produced by scanning/illuminating mechanism 160 to automatically orient a document to its proper orientation, depending upon which scan slot 130 or scan slot 150 a user decides to use as an entry point for scanning.

Depending upon the direction of scanning, that is if a user places a document into scan slot 130 or if a user places a document into scan slot 150, the various rollers 125 turn in either a clockwise or counterclockwise direction. Depending upon the direction of scanning, either a roller 125 at scan slot 130 or a roller 125 at scan slot 150 is activated to push and/or pull a document past scanning/illuminating mechanism 160. Alternately, rollers 125 at both scan slot 130 and scan slot 150 can be activated to allow a document to pass over scanning/illuminating mechanism 190.

In accordance with the principles disclosed herein, the scanning/illuminating mechanism 190 can perform two functions. Scanning/illuminating mechanism 190 can include a light source and an image sensor. The light source from scanning/illuminating mechanism 190 can illuminate LCD 170. Moreover, the light source from scanning/illuminating mechanism 190 can illuminate a document that is being scanned by the scanning/illuminating mechanism 190.

The image sensor of scanning/illuminating mechanism 190 provides an image of a document being scanned and passes that image to the base portion 140 of the laptop computer 100. The interface between scanning/illuminating mechanism 160 can be any of a variety of computer data paths that include both parallel and serial data communication lines, e.g., Small Computer System Interface (SCSI), serial SCSI, Universal Serial Bus (USB), IEEE 1394, Advanced Technology Attachment (ATA), serial ATA (SATA), Peripheral Component Interface (PCI), PCI Express (PCIe), etc.

The scanning/illuminating mechanism 190 can be controlled through software executed on the base portion 140 of the laptop computer 100. The brightness of the light source of the scanning/illuminating mechanism 190 can be controlled through software to adjust the properties of an image produced by the image sensor, e.g., contrast, brightness, etc.

Scanning can be initiated with simply placing a document within either scan slot 130 or scan slot 150. Software within the base portion 140 of the laptop computer 100 can detect that a roller 125 has been slightly turned and automatically initiate scanning of the document placed in scan slot 130 or scan slot 150. Alternately, scanning can be initiated through software executed within the base portion 140 of the laptop computer 100. A user can select to scan a document with an appropriate software application. The user can place a document in scan slot 130 or scan slot 150 either before or after the software application initiates scanning, with scanning of the document being performed appropriately as is known within the art.

Importantly, an illumination gap 180 can provide a path for light to travel from scanning/illuminating mechanism 190 to a path for a document to pass between scan slot 130 and scan slot 150, and vise versa. During LCD 170 illumination, scanning/illuminating mechanism 190 pivots to direct light toward LCD 170. In this manner, scanning/illuminating mechanism 190 pivots about pivot point 195 to provide light for both scanning and LCD 170 illumination.

Although scanning/illuminating mechanism 190 is described herein as pivoting about pivot point 195, scanning/illuminating mechanism 190 can also be a fixed scanning/illuminating mechanism 190 that illuminates in two directions simultaneously, to allow for document scanning and LCD 170 illumination without the need to pivot.

FIG. 2 shows a cross-sectional view of an alternate embodiment of a display portion that includes a scanning/illuminating mechanism, in accordance with the principles of the present invention.

FIG. 2a shows a left side view of a laptop computer integrating a scanning mechanism, in accordance with an embodiment of the principles of the present invention.

In particular, as shown in FIG. 2a, laptop computer 200 can include a hinge 210, a novel display portion 220, and a base portion 240. The novel display portion 220 of the laptop computer 100 can include a scan slot 255 and a second hinge 250.

The display portion 220 can optionally include an upper display portion 220a and a lower display portion 220b. The upper display portion 220a and lower display portion 220b can pivotally separate about hinge 250. The upper display portion 220a and lower display portion 220b can pivotally separate about hinge 250 to allow for access to documents that may have become stuck within display portion 220. Hinge 250 preferably provides appropriate resistance to allow upper display portion 220a and lower display portion 220b to remain in an open clamshell position to access a document that may have jammed during scanning.

The hinge 210 allows the display portion 220 to pivotally move about the hinge 210 with respect to the base portion 240, with a clamshell type of movement. As with conventional laptop computers, the hinge 210 provides resistance to movement such that the display portion 220 can be placed at a desired angle with respect to the base portion 240 without movement. A user can arrange the display portion 220 at various degrees of angle with respect to the base portion 240 that are convenient for viewing images on the display portion 220 and/or scanning documents.

The scan slot 255 along the left side of the display portion 240 can provide a document entry point or a document exit point from the display portion 220, depending upon the direction of scanning. A user can slide a document into the scan slot 255. Alternately, a user can retrieve a document that has been scanned from scan slot 255.

FIG. 2b shows a right side view of a laptop computer integrating a scanning mechanism, in accordance with an embodiment of the principles of the present invention.

In particular, as shown in FIG. 2b, laptop computer 200 can include a second scan slot, scan slot 230 along display portion 220.

The scan slot 230 along the right side of the display portion 240 can provide a document entry point or a document exit point from the display portion 220, depending upon the direction of scanning. A user can slide a document into the scan slot 230. Alternately, a user can retrieve a document that has been scanned from scan slot 230.

In particular, as shown in FIG. 2c, the display portion 220 of the laptop computer 200 can include a scan slot 230, a scan slot 250, various rollers 225, a scanning/illuminating mechanism 290, and an LCD 270. The scanning/illuminating mechanism 290 preferably pivots about pivot point 295.

The various rollers 225 can be either motorized or non-motorized. At least one roller 225 within the display portion 220 can be motorized to pull or push a document past scanning/illuminating mechanism 290. Preferably, one roller 225 at scan slot 250 and one roller at scan slot 230 is motorized to give a user an option to feed a document either through scan slot 230 or scan slot 250.

Depending upon the direction of scanning, that is if a user places a document into scan slot 230 or if a user places a document into scan slot 250, the various rollers 225 turn in either a clockwise or counterclockwise direction. Depending upon the direction of scanning, either a roller 225 at scan slot 230 or a roller 225 at scan slot 250 is activated to push and/or pull a document past scanning/illuminating mechanism 290.

In accordance with the principles disclosed herein, the scanning/illuminating mechanism 290 can perform two functions. Scanning/illuminating mechanism 290 can include a light source and an image sensor. The light source from scanning/illuminating mechanism 290 can illuminate LCD 270. Moreover, the light source from scanning/illuminating mechanism 290 can illuminate a document that is being scanned by the scanning/illuminating mechanism 290. The image sensor of scanning/illuminating mechanism 290 provides an image of a document being scanned and passes that image to the base portion 240 of the laptop computer 200.

The scanning/illuminating mechanism 290 can be controlled through software executed on the base portion 240 of the laptop computer 200. The brightness of the light source of the scanning/illuminating mechanism 290 can be controlled through software to adjust the properties of an image produced by the image sensor, e.g., contrast, brightness, etc.

In contrast to the fixed position scanning/illuminating mechanism 160, the scanning/illuminating mechanism 290 can pivot about pivot point 295. During LCD 270 illumination, scanning/illuminating mechanism 290 pivots to shine light toward LCD 270. During scanning, scanning/illuminating mechanism 290 pivots to shine light toward LCD 270.

Although scanning/illuminating mechanism 290 is described herein as pivoting about pivot point 295, within the principles disclosed herein scanning/illuminating mechanism 290 can also be a fixed scanning/illuminating mechanism 290 that illuminates in two directions simultaneously, to allow for document scanning and LCD 270 illumination without the need to pivot.

The scanning/illuminating mechanism 160, the scanning/illuminating mechanism 190, and the scanning/illuminating mechanism 290 can rely on any lighting technology that provides adequate light for both scanning a document and illuminating the display 170 and the display 270. For example, lighting for fixed scanning/illuminating mechanism 160, the scanning/illuminating mechanism 190, and the scanning/illuminating mechanism 290 can be provided by a light emitting diode (LED), a fluorescent light tube, halogen, high-intensity discharge (HID), etc.

Although LCD 170 and LCD 270 are described herein as being liquid crystal displays, any of a variety of display types that rely on backlighting can be used in accordance with the principles disclosed herein.

While the invention has been described with reference to the exemplary embodiments thereof, those skilled in the art will be able to make various modifications to the described embodiments of the invention without departing from the true spirit and scope of the invention.

What is claimed is:

1. A method of scanning a document with a laptop computer, comprising:
    illuminating a display portion of said laptop computer with a scanning/illuminating mechanism, said scanning/illuminating mechanism associated with a scan slot extending along a side of said display portion;
    illuminating a document with said scanning/illuminating mechanism; and
    scanning said document with said scanning/illuminating mechanism.

2. The method of scanning a document with a laptop computer according to claim 1, further comprising:
    pivotally mounting said scanning/illuminating mechanism to said display portion of said laptop computer.

3. The method of scanning a document with a laptop computer according to claim 1, wherein:
    said display portion is comprised of a liquid crystal display (LCD).

4. The method of scanning a document with a laptop computer according to claim 1, further comprising:
    at least one of pushing and pulling said document past said scanning/illuminating mechanism by a roller.

5. A method of scanning a document with a laptop computer, comprising:
    providing a scanning/illuminating mechanism;
    illuminating a display of said laptop computer with said scanning/illuminating mechanism;
    illuminating a document with said scanning/illuminating mechanism; and
    automatically scanning said document when said document is detected against a roller in a display portion of said laptop computer.

6. A method of scanning a document with a laptop computer, comprising:
    illuminating a display portion of said laptop computer with a scanning/illuminating mechanism, said scanning/illuminating mechanism extending along a side of said display portion;
    illuminating a document with said scanning/illuminating mechanism; and
    scanning said document with said scanning/illuminating mechanism;
    wherein said display portion of said laptop computer is comprised of an upper display portion and a lower display portion.

7. The method of scanning a document with a laptop computer according to claim 6, further comprising:
    pivotally mounting said upper display portion and said lower display portion to said laptop computer.

8. A method of scanning a document with a laptop computer, comprising:
    providing a scanning/illuminating mechanism;
    illuminating a display of said laptop computer with said scanning/illuminating mechanism;
    illuminating a document with said scanning/illuminating mechanism; and
    automatically orienting a digital representation of said document according to which of a first scan slot and a second scan slot said document enters said laptop computer.

9. The method of scanning a document with a laptop computer according to claim 1, further comprising:
    integrating said scanning/illuminating mechanism with said display portion of said laptop computer.

10. The method of scanning a document with a laptop computer according to claim 1, wherein:
    said document is illuminated with a light emitting diode (LED).

11. The method of scanning a document with a laptop computer according to claim 1, wherein:
    said document is illuminated with a fluorescent light tube.

12. A method of scanning a document with a laptop computer, comprising:
    providing a scanning/illuminating mechanism;
    illuminating a display of said laptop computer with said scanning/illuminating mechanism;
    illuminating a document with said scanning/illuminating mechanism; and
    providing for at least one of a document entry slot and a document exit slot along a side of a display portion of said laptop computer.

13. A method of scanning a document with a laptop computer, comprising:

providing a scanning/illuminating mechanism;
illuminating a display of said laptop computer with said scanning/illuminating mechanism;
illuminating a document with said scanning/illuminating mechanism; and
providing for at least one of a document entry slot and a document exit slot along a top of a display portion of said laptop computer.

14. A laptop computer, comprising:
a base portion of said laptop computer;
a display portion of said laptop computer; and
a scanning/illuminating mechanism associated with a scan slot extending along a side of said display portion, said scanning/illuminating mechanism to illuminate a display of said display portion of said laptop computer and a document during scanning of said document.

15. The laptop computer according to claim 14, wherein:
said scanning/illuminating mechanism is pivotally mounting to said display portion of said laptop computer.

16. The laptop computer according to claim 14, wherein:
said display is an liquid crystal display (LCD).

17. The laptop computer according to claim 14, wherein:
said document is at least one of pushed and pulled past said scanning/illuminating mechanism by a roller.

18. (allowed) A laptop computer, comprising:
a base portion;
a display portion; and
a scanning/illuminating mechanism, said scanning/illuminating mechanism to illuminate a display of said display portion of said laptop computer and to illuminate a document during scanning of said document;
wherein said document is automatically scanned when said document is detected against a roller in said display portion of said laptop computer.

19. A laptop computer comprising:
a base portion of said laptop computer;
a display portion of said laptop computer;
a scanning/illuminating mechanism extending along a side of said display portion, said scanning/illuminating mechanism to illuminate a display of said display portion of said laptop computer and a document during scanning of said document;
an upper display portion of said display portion of said laptop computer; and
a lower display portion of said display portion of said laptop computer.

20. The laptop computer according to claim 19, further comprising:
a hinge to pivotally mount said upper display portion and said lower display portion to said laptop computer.

21. A laptop computer, comprising:
a base portion;
a display portion;
a scanning/illuminating mechanism, said scanning/illuminating mechanism to illuminate a display of said display portion of said laptop computer and to illuminate a document during scanning of said document; and
image manipulation software executed on said laptop computer to automatically orient a digital representation of said document according to which of a first scan slot and a second scan slot said document enters said display portion of said laptop computer.

22. The laptop computer according to claim 14, wherein:
said scanning/illuminating mechanism is integrated with said display portion of said laptop computer.

23. The laptop computer according to claim 14, wherein:
said scanning/illuminating mechanism is comprised of a light emitting diode (LED).

24. The laptop computer according to claim 14, wherein:
said scanning/illuminating mechanism is comprised of a fluorescent light tube.

25. A laptop computer, comprising:
a base portion;
a display portion;
a scanning/illuminating mechanism, said scanning/illuminating mechanism to illuminate a display of said display portion of said laptop computer and to illuminate a document during scanning of said document;
a document entry slot along a top of said display portion; and
a document exit slot along a side of said of a display portion.

26. A laptop computer, comprising:
a base portion;
a display portion;
a scanning/illuminating mechanism, said scanning/illuminating mechanism to illuminate a display of said display portion of said laptop computer and to illuminate a document during scanning of said document;
a document entry slot along a side of said display portion; and
a document exit slot along a top said of a display portion.

* * * * *